United States Patent
Ashkar et al.

(10) Patent No.: US 11,900,123 B2
(45) Date of Patent: Feb. 13, 2024

(54) MARKER-BASED PROCESSOR INSTRUCTION GROUPING

(71) Applicant: ADVANCED MICRO DEVICES, INC., Santa Clara, CA (US)

(72) Inventors: Alexander Fuad Ashkar, Orlando, FL (US); Manu Rastogi, Orlando, FL (US); Harry J. Wise, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/713,432

(22) Filed: Dec. 13, 2019

(65) Prior Publication Data

US 2021/0182072 A1    Jun. 17, 2021

(51) Int. Cl.
*G06F 9/30*  (2018.01)
*G06F 9/38*  (2018.01)
*G06T 1/20*  (2006.01)
*G06F 15/80* (2006.01)

(52) U.S. Cl.
CPC .......... *G06F 9/3869* (2013.01); *G06F 9/3836* (2013.01); *G06F 15/80* (2013.01); *G06T 1/20* (2013.01)

(58) Field of Classification Search
CPC ....... G06F 9/3869; G06F 9/3836; G06F 15/80
See application file for complete search history.

(56) References Cited

U.S. PATENT DOCUMENTS

| | | | |
|---|---|---|---|
| 8,707,314 B2 * | 4/2014 | Gummaraju | G06F 9/5044 718/102 |
| 10,157,480 B2 | 12/2018 | Zhu et al. | |
| 10,671,131 B2 * | 6/2020 | Kalyanasundaram | G06F 1/3296 |
| 2016/0335143 A1 * | 11/2016 | Sen | G06F 11/3433 |
| 2017/0206169 A1 * | 7/2017 | Coppola | G06F 9/44505 |
| 2018/0089881 A1 * | 3/2018 | Johnson | G06F 9/45558 |
| 2018/0103261 A1 | 4/2018 | Sun et al. | |
| 2019/0043158 A1 * | 2/2019 | Levit-Gurevich | G06F 11/34 |

* cited by examiner

*Primary Examiner* — Corey S Faherty

(57) ABSTRACT

A system includes a processing unit such as a GPU that itself includes a command processor configured to receive instructions for execution from a software application. A processor pipeline coupled to the processing unit includes a set of parallel processing units for executing the instructions in sets. A set manager is coupled to one or more of the processor pipeline and the command processor. The set manager includes at least one table for storing a set start time, a set end time, and a set execution time. The set manager determines an execution time for one or more sets of instructions of a first window of sets of instructions submitted to the processor pipeline. Based on the execution time of the one or more sets of instructions, a set limit is determined and applied to one or more sets of instructions of a second window subsequent to the first window.

20 Claims, 5 Drawing Sheets

MARKER-BASED PROCESSOR INSTRUCTION GROUPING

BACKGROUND

In modern computing systems, instructions are submitted to a processor pipeline such as to a processor pipeline of a graphics processing unit (GPU), a central processing unit (CPU), an accelerated processing unit (APU), and the like. A GPU is a processing unit configured to efficiently perform graphics and vector processing tasks, by splitting the instructions into specified units or sets of operations to be processed in parallel by parallel processing modules. The GPU includes single instruction multiple data (SIMD) cores that synchronously execute, in parallel, sets of instructions for processing a substantial number of operations in a given amount of time. A plurality of similar operations that are processed by a set of SIMD cores of the GPU are referred to as a wavefront or warp. A command processor or other module of the GPU schedules the wavefront operations at the SIMD cores to ensure timely completion of the wavefronts at the processor. However, conventional approaches to wavefront scheduling can use the resources of the GPU inefficiently.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Described herein are techniques for improving GPU efficiency by throttling submission of instructions to one or more GPU pipelines based on previously determined execution data for similar sets of instructions. For example, in some embodiments a set manager keeps track of sets of instructions submitted to the GPU pipeline by monitoring associated marker events. The set manager uses the marker events as delimiters for each set of instructions sent to the GPU pipeline for execution. The set manager determines an execution time of each set of instructions by recording an initial time each marker event is sent to the GPU pipeline and also determines a completion or end time for the sent set of instructions when the set manager determines that the marker event completes. A difference between the initial time and the end time is determined and stored as an execution time for each respective set of instructions. In some embodiments, the execution time is for sets of instructions originating from a same source (e.g., a software application, an operating system function, a kernel function).

By characterizing this execution time, the set manager is able to determine an amount of processor pipeline availability or capacity in subsequent windows of time in which a set of previously-characterized sets of instructions are submitted to the processor pipeline. Based on the availability and based on a previous execution time, the processor tunes or otherwise designates a number of sets of instructions issued to the processor pipeline for each window of time as well as a set-size for the sets of instructions of the respective windows such as based on a set ID basis. The set manager thus adaptively tunes workload submissions to the processor pipeline and thereby improves processing efficiency and is able to more efficiently switch sets of instructions of various applications submitted to the processor pipeline. The tuning is performed by adaptively controlling workload submissions to the processor pipeline based on one or more parameters such as an application parameter, an operating system parameter or setting, a hardware setting, a quality of service parameter, a context switch time, a processor power setting, a processor throughput setting, and the like.

Figure 1:
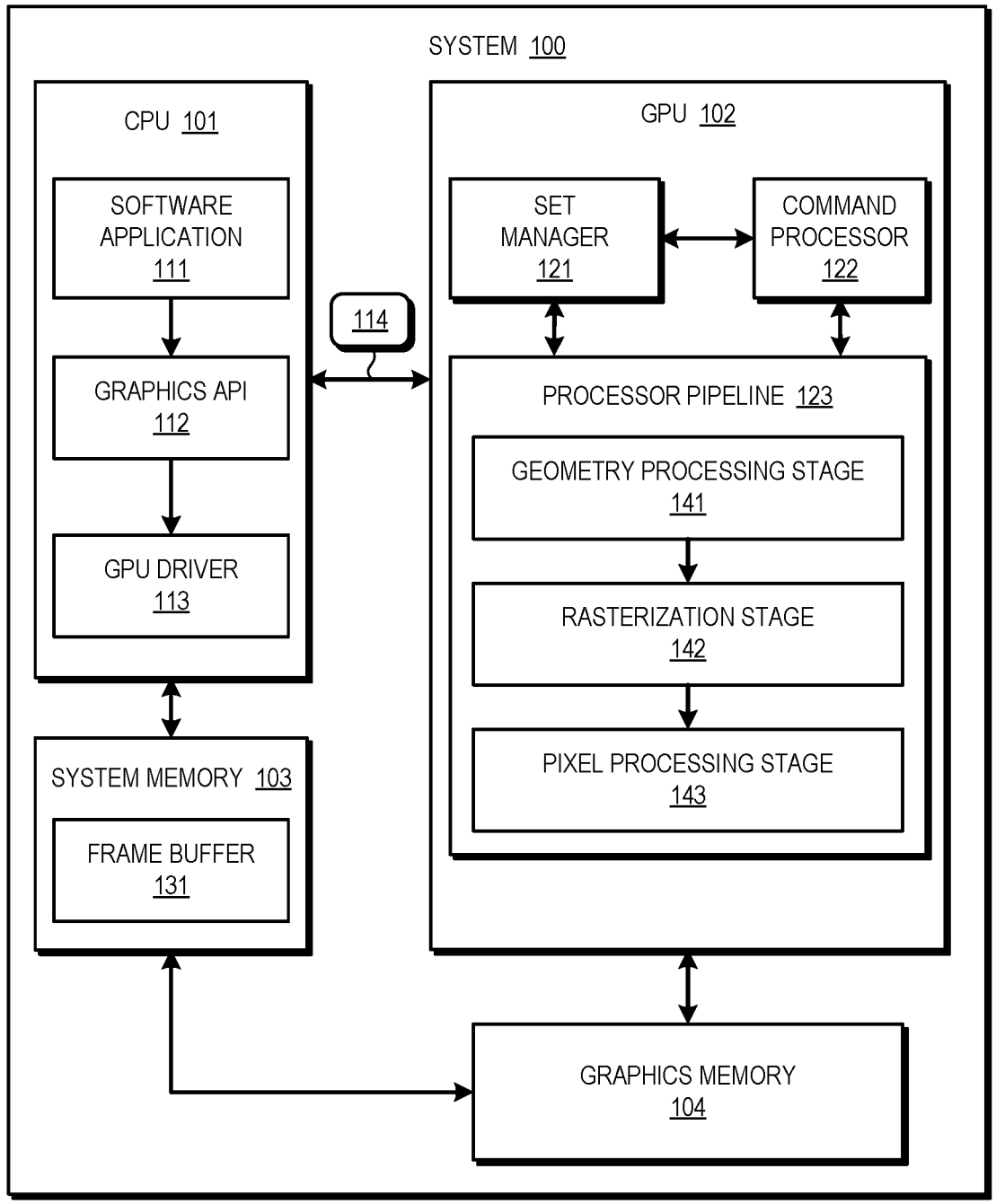
FIG. 1 is a block diagram of a processing system that controls work units submitted to a processor pipeline according to some embodiments.

FIG. 1 is a block diagram of a processing system 100 that controls work units submitted to a processor pipeline 123 according to some embodiments. The system 100 illustrates example implementations of a central processing unit (CPU) 101, a graphics processing unit (GPU) 102, a system memory 103, and a graphics memory 104. For sake of simplicity of illustration, only a few of the components are illustrated in the system 100. The system 100 includes at least one software application 111, a graphics application programming interface (API) 112, and a GPU driver 113, each of which includes one or more software applications or services in the form of instructions that are executed by components of the CPU 101.

The GPU 102 includes the processor pipeline 123 that, in turn, includes a plurality of graphics processing stages that operate together to execute graphics processing instructions. For example, in the illustrated example, the processor pipeline 123 includes a geometry processing stage 141, a rasterization stage 142, and a pixel processing stage 143. The GPU 102 is configured to execute instructions by the processor pipeline 123 in a variety of rendering modes, including a binning rendering mode (also called a tile-based or deferred rendering mode) and a direct rendering mode. In some embodiments, the GPU 102 is also operable to execute a general purpose shader for performing more general computations applicable to be executed by the highly parallel nature of the GPU 102.

As illustrated in FIG. 1, the GPU 102 also includes a command processor 122 that prepares and feeds instructions into the processor pipeline 123. The command processor 122 receives instructions in a stream to be executed by the processor pipeline 123. The processor pipeline 123 is shown as single stack of components for simplicity of illustration only. In some embodiments, the processor pipeline 123 is a set of pipelines and the command processor 122 distributes instructions at the one or more graphics pipelines for execution. In operation, the command processor 122 processes a header of a command packet in the command stream submitted to the GPU 102 to identify an address associated with a command such as a draw command or dispatch command represented by the command packet. The command processor 122 stores the address at a location of a ring buffer (not illustrated) pointed to by a write pointer and advances the write pointer of the ring buffer. In some embodiments where instructions are presented as wavefronts, the command processor 122 also stores a wavefront identifier for a wavefront generated based on the command of the packet. The command processor 122 advances the read pointer of the ring buffer after wavefronts associated with each command complete processing through the processor pipeline 123. In this manner, the command processor 122 performs fine level logging of command addresses and allows the GPU 102, in the event of an exception, to track which command creates a fault. In various embodiments, the command processor 122 manages multiple command buffers, keeps track of instructions and work units sent to the GPU 102, and updates fences once the command stream has reached the buffers.

Each of the components in the processor pipeline 123 is implemented as fixed-function components, programmable components (e.g., as part of a shader program executing on a programmable shader unit), or as a combination of fixed-function and programmable components. Memory available to the CPU 101 and the GPU 102 includes the system memory 103, that itself includes a frame buffer 131, and a graphics memory 104 that is dedicated to use by the GPU 102. In some embodiments, the frame buffer 131 of the system memory 103 stores rendered image data. In other embodiments, the graphics memory 104 stores the rendered image data.

The software application 111 is any application that uses a functionality of the GPU 102. For example, in some embodiments the software application 111 is one of a GUI application, an operating system, a portable mapping application, a computer-aided design program for engineering, an artistic application, a video game application, or another type of software application that uses 2D or 3D graphics. In some embodiments, the software application 111 is an application that uses the GPU 102 to perform more general calculations, such as a general purpose GPU (GPGPU) application. Further, to illustrate a mechanism of control of the processor pipeline 123, the software application 111 includes instructions that instruct the GPU 102 to render a graphical user interface (GUI) or a graphics scene. For example, the drawing instructions include instructions that define a set of one or more graphics primitives to be rendered by the GPU 102. The drawing instructions collectively define all or part of a plurality of windowing surfaces used in the GU or all or part of a graphics scene that includes one or more graphics objects within a model space or world space defined by the application 111. The software application 111 is operative in the CPU 101 as a second processor configured to send instructions to create sets of instructions in the GPU 102 to submit for execution to the processor pipeline 123.

In some embodiments, and as illustrated in the system 100, the software application 111 invokes the GPU driver 113, via the graphics API 112, to issue one or more instructions to the GPU 102 for rendering one or more graphics primitives into displayable graphics images. In some embodiments, the graphics primitives are represented in the form of primitive definitions. In some instances, the primitive definitions are provided to the GPU 102 in the form of a list of drawing primitives (e.g., triangles, rectangles, triangle fans, triangle strips). The primitive definitions include vertex specifications that specify one or more vertices associated with the primitives to be rendered. The vertex specifications include positional coordinates for each vertex and, in some instances, other attributes associated with the vertex, such as color coordinates, normal vectors, and texture coordinates. In some embodiments, the primitive definitions also include primitive type information (e.g., a triangle, a rectangle, a triangle fan, a triangle strip), scaling information, rotation information, and the like. Based on instructions 114 originated by the software application 111, the GPU driver 113 formulates one or more instructions 114 that specify one or more operations for the GPU 102 to perform in order to render the primitive. When the GPU 102 receives an instruction 114 from the CPU 101, the command processor 122 of the GPU 102 decodes the instruction 114 and configures one or more processing elements within the processor pipeline 123 to perform the operation specified in the command 114. After performing the specified operations, the processor pipeline 123 outputs the rendered data to the frame buffer 131 associated with a display device (not illustrated for sake of convenience).

The processor pipeline 123 is configured to receive the one or more processing instructions 114 from the CPU 101, via the GPU driver 113, and to execute the processing instructions to generate displayable graphics images. The stages 141-143 need not necessarily be implemented in separate hardware blocks as illustrated. For example, in some embodiments, portions of the geometry processing stage 141 and the pixel processing stage 143 are implemented as part of a unified shader unit.

For sake of example, the processing instructions 114 include drawing instructions and graphics state instructions. The drawing instructions include vertex specification instructions that specify positional coordinates for one or more vertices and, in some instances, other attribute values associated with each of the vertices, such as color coordinates, normal vectors, and texture coordinates. The graphics state instructions include primitive type instructions, transformation instructions, lighting instructions, and so forth. The primitive type instructions specify the type of primitive to be rendered or how vertices are combined to form a primitive. In some embodiments, the transformation instructions specify types of transformations to perform on the vertices. Lighting instructions specify one or more of a type, a direction and a placement of different lights within a graphics scene. The command processor 122 causes the geometry processing stage 141 to perform geometry processing with respect to vertices and primitives associated with one or more of the received instructions 114.

The rasterization stage 142 is configured to receive, from the geometry processing stage 141, primitive data that represents a primitive to be rasterized, and to rasterize the primitive to generate a plurality of source pixels that correspond to the rasterized primitive. In some embodiments, the rasterization stage 142 determines which screen pixel locations are covered by the primitive to be rasterized, and generate a source pixel for each screen pixel location determined to be covered by the primitive. The rasterization stage 142 determines which screen pixel locations are covered by a primitive by using techniques known to those of skill in the art. The rasterization stage 142 provides resulting source pixels to the processor pipeline 123 for further processing.

The pixel processing stage 143 is configured to receive a source pixel associated with a rasterized primitive, and to perform one or more per-pixel operations on the source pixel. In some embodiments, per-pixel operations performed by the pixel processing stage 143 include, for example, an alpha test, a texture mapping, a color computation, a pixel shading, and a per-pixel lighting. The pixel processing stage 143 executes one or more pixel shader programs to perform one or more per-pixel operations. The resulting data produced by the pixel processing stage 143 are referred to as destination pixel data and stored in the frame buffer 131.

The GPU driver 113 is configured to compile one or more shader programs (not illustrated), and to download compiled shader programs onto one or more programmable shader units contained within the GPU 102. In some embodiments, the shader programs are written in a high level shading language, such as, e.g., an OpenGL Shading Language (GLSL), a High Level Shading Language (HLSL), and a C for Graphics (Cg) shading language. The compiled shader programs include one or more instructions that control the operation of a programmable shader unit (not illustrated) within the GPU 102. For example, shader programs include one or more vertex shader programs or pixel shader programs. A vertex shader program controls execution of a programmable vertex shader unit or a unified shader unit, and includes instructions that specify one or more per-vertex operations. A pixel shader program includes pixel shader programs that control the execution of a programmable pixel shader unit or a unified shader unit, and includes instructions that specify one or more per-pixel operations. In accordance with some examples of this disclosure, a pixel shader program also includes instructions that selectively cause texture values to be retrieved for source pixels based on corresponding destination alpha values for the source pixels.

The frame buffer 131 stores destination pixels for the GPU 102. Each destination pixel is associated with a particular location on a display device (not illustrated) such as at a particular screen pixel location. In some examples, the frame buffer 131 stores color components and a destination alpha value for each destination pixel. For example, the frame buffer 131 stores a red (R), a green (G), a blue (B), and an alpha (A) component, collectively RGBA, for each pixel where the RGB components correspond to color values and the A component corresponds to a destination alpha value. Alternatively, pixel values are represented by a luma component (Y) and one or more chroma components (e.g., U and V). Although the frame buffer 131 as a destination for an output of the GPU 102 and is illustrated in the system memory 103, in other embodiments the frame buffer 131 is in the graphics memory 104.

The instructions 114 are sent to the GPU 102 where the GPU 102 executes the instructions by submitting instructions in sets to the processor pipeline 123. While the processor pipeline 123 of the GPU 102 is illustrated as a single unit, the processor pipeline 123 includes a plurality of compute units (CUs) (not illustrated) that operate in parallel and operate according to a single-instruction multiple-data (SIMD) paradigm. The instructions 114 are of a type that takes advantage of a highly parallel structure of GPU processing units including arithmetic logic units (ALUs). The GPU 102 allows the application 111 to have access across multiple processor components and in the heterogeneous system 100.

To facilitate efficient provision of sets of instructions to the processor pipeline 123, the GPU 102 includes a set manager 121. As described further herein, the set manager 121 performs at least two types of operations: 1) characterization of designated sets of instructions; and 2) provision of sets of instructions to the processor pipeline based on the characterizations. For characterization, the set manager 121 keeps track of sets of instructions submitted to the processor pipeline 123 by monitoring specified marker events that represent delimiters for each set of instructions sent to the GPU pipeline for execution. In particular, the set manager 121 determines an execution time of each set of instructions by recording an initial time each marker event is sent to the GPU pipeline and determines a completion for the set of instructions based on when the set manager determines that the marker event completes. The set manager 121 stores the difference between the initial time and the end time as an execution time for the respective set of instructions.

Based on the stored execution time, the set manager 121 determines an amount of processor pipeline availability or capacity in subsequent windows of time in which a set of previously-characterized sets of instructions are submitted to the processor pipeline 123. Based on the availability, the set manager 121 adjusts a number of sets of instructions issued to the processor pipeline for each window of time as well as adjusts a set-size for the sets of instructions of the respective windows. The set manager 121 thus adaptively adjusts submissions of sets of instructions to the processor pipeline, as described further below.

Figure 2:
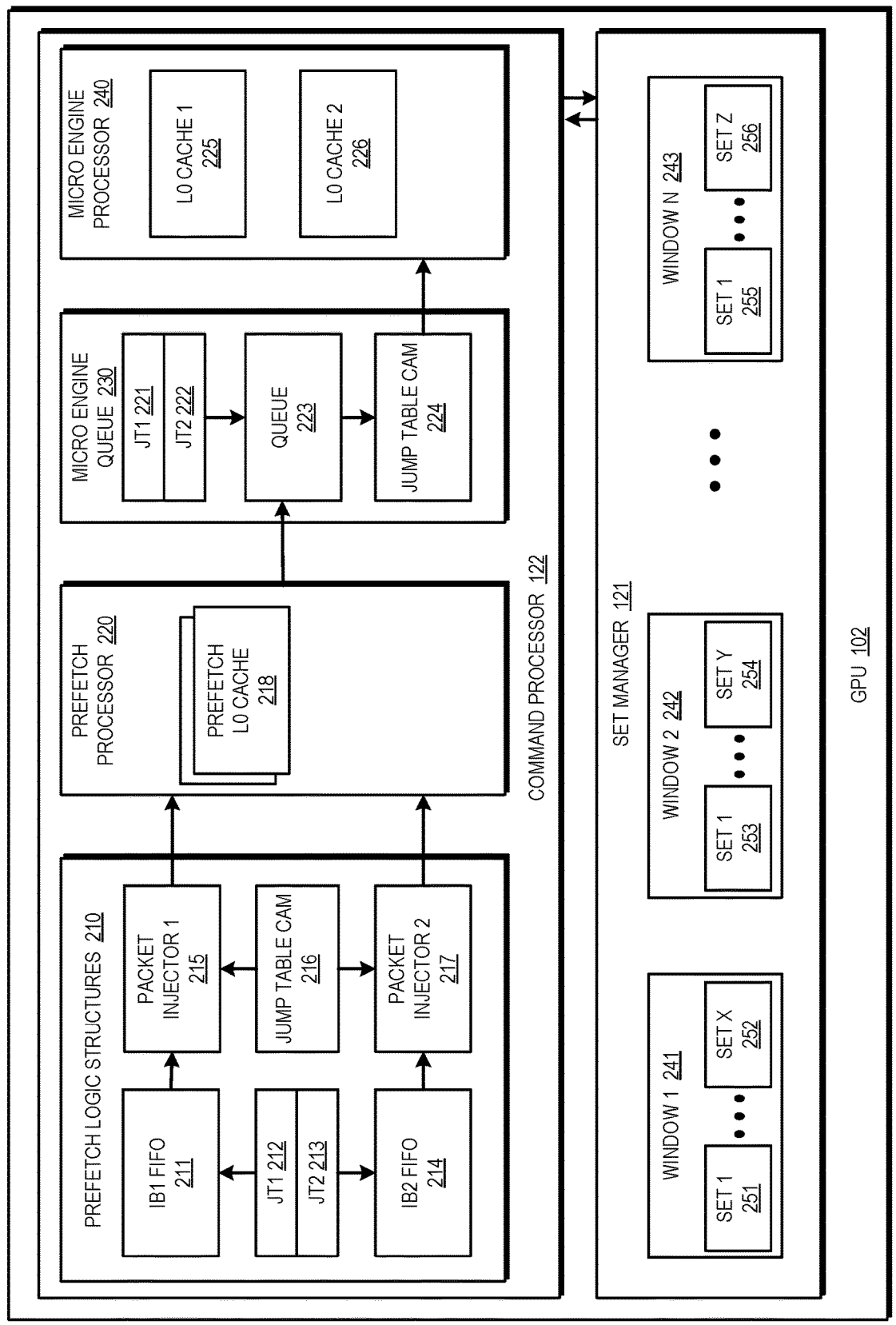
FIG. 2 is a block diagram of additional structures of the GPU illustrated in FIG. 1 according to some embodiments.

FIG. 2 is a block diagram of additional structures of the GPU 102 first illustrated in FIG. 1 according to some embodiments. The GPU 102 includes the set manager 121 and the command processor 122. In the GPU 102, the set manager 121 tracks all or certain sets of instructions submitted to the processor pipeline 123 and groups all or the certain (e.g., identified) sets of instructions into windows. According to some embodiments, the set manager 121 includes a plurality of windows 241, 242, 243 numbered 1, 2 and N, respectively, for tracking purposes, where N is any integer (e.g., 4 windows, 10 windows, 100 windows, and the like). In each window 241-243, a number of sets of instructions is tracked. Each of the windows 241-243 is capable of having its own number of sets of instructions different from the number of sets of instructions in other windows. This aspect of the windows 241-243 is represented by: numbers 1-X (sets of instructions 251, 252) for a first window 241, numbers 1-Y (sets of instructions 253, 254) for a second window 242, and numbers 1-Z (sets of instructions 255, 256) for a Nth numbered window 243. In some embodiments of the set manager 121, each window 241-243 represents a certain number of processing cycles of the GPU 102 or a pre-determined number of clock cycles or amount of time for processing instructions 114 submitted to the GPU 102. For example, in a first window 241, information about a plurality of sets of instructions 251, 252 is stored and used for control of sets of instructions submitted in a future window to the processor pipeline 123 and thereby control of the GPU 102 at a finer level of control than conventional mechanisms.

The command processor 122 includes a plurality of structures for caching instructions or instructions 114 from the CPU 101 and queuing instructions for efficient execution by the processor pipeline 123 of the GPU 102. As one example of structures, the command processor 122 includes a set of prefetch logic structures 210, a prefetch processor 220, a micro engine queue 230, and a micro engine processor 240. For example, the set of prefetch logic structures 210 includes: first and second indirect buffers (IBs) 211, 214; jump tables 212, 213; packet injectors 215, 217; and a jump table content-addressable-memory (CAM) 216. By way of example, in response to receiving a data value, the jump table CAM 216 searches its stored memory values to see whether that data value is stored in the jump table CAM 216. If so, the jump table CAM 216 returns one or more storage addresses where the data value is found, and, in some architectures, contents of that storage address, or other associated data value or values.

Instructions organized in the set of prefetch logic structures 210 are sent to the prefetch processor 220 in the form of packets by the packet injectors 215, 217. The prefetch processor 220 includes a set of first level (L0) prefetch caches 218. The prefetch processor 220 provides instructions to the micro engine queue 230. In turn, the micro engine queue 230 includes various structures to organize the instructions for the micro engine processor 240. For example, the micro engine queue 230 includes one or more jump tables illustrated as a set of jump tables 221, 222 numbered 1 and 2, a queue 223, and a jump table CAM 224. The micro engine queue 230 allows the prefetch processor 220 to work ahead of the micro engine processor 240 and the micro engine queue 230 thereby avoids or reduces a number of empty processor cycles by the micro engine processor 240 when the GPU 102 processes instructions.

The micro engine processor 240 includes various structures including one or more first-level (L0) caches. In the command processor 122, these caches are numbered 1 and 2: a first L0 cache 225 and a second L0 cache 226. The first level caches 225, 226 store instructions for execution by the processor pipeline 123 of the GPU 102. In some embodiments, the first level caches 225, 226 support and provide instructions by multiple processor pipelines arranged in parallel with each other where each pipeline is like that of the processor pipeline 123. One, two, or more pipelines 123 are thereby provided instructions from each of the first level caches 225, 226. The structures of the set manager 121 and the command processor 122 are illustrative of various possible structures for tracking instructions within the GPU 102. In some embodiments, the micro engine processor 240 is a RISC-based processor and includes structures specifically to efficiently perform many graphic-related functions in parallel for the system 100.

As the GPU 102 operates, the set manager 121 is in communication with the command processor 122. The set manager 121 identifies at least a set ID, a start marker event, and an end marker event for each set of instructions submitted by the command processor 122 into the processor pipeline 123. The set manager 121 stores information about the sets of instructions for the windows 241-243 in certain structures such as those illustrated in FIG. 3.

Figure 3:
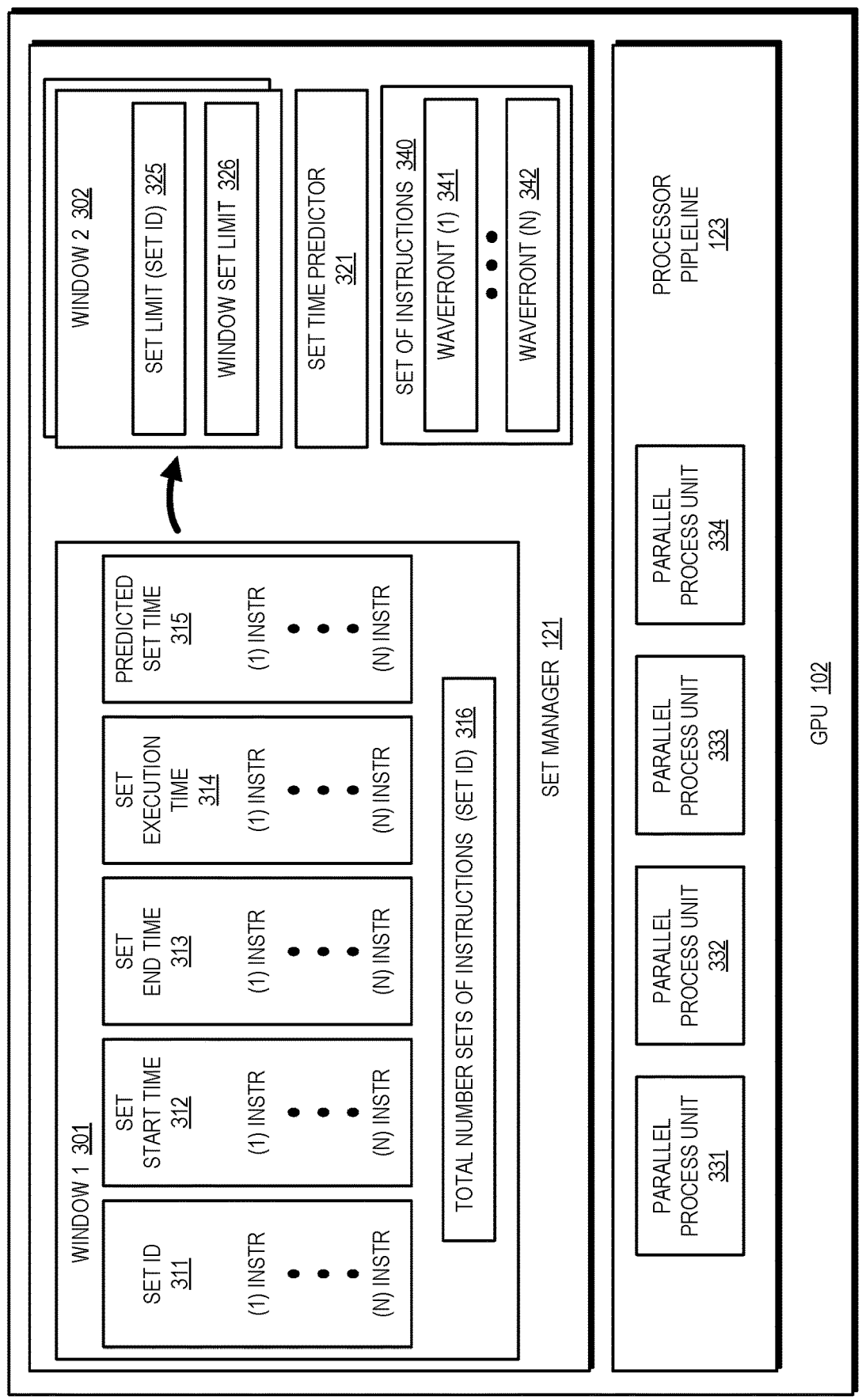
FIG. 3 is a block diagram of additional structures of the GPU and set manager illustrated in FIG. 1 according to some embodiments.

FIG. 3 is a block diagram of additional structures of the GPU 102 and set manager 121 first illustrated in FIG. 1 according to some embodiments. The set manager 121 includes windows for storing the information about the sets of instructions submitted to the GPU 102 for execution such as a first window 301. in some embodiments, the set manager 121 determines a set execution time for each set of instructions in a group or window. Using the set execution times, the set manager 121 provides a set limit for one or more subsequent groups or windows of other sets of instructions. The first window 301 is illustrative of all windows 301, 302 in the GPU 102. The window 301 is an embodiment of the windows 241-243 including the first window 241, the second window 242, and an Nth window 243.

The window 301 is accessible by the set manager 121. For the first window 301, the set manager 121 stores one or more of a set ID 311, a set start time 312, a set end time 313, a set execution time 314, and a predicted set time 315 for each set of instructions submitted to the processor pipeline 123 for execution for the window 301. In some embodiments, the times 312-315 are timestamps and processed as timestamps accordingly. The set manager 121 stores one or more of these times 312-315 after determining the start time 312, the end time 313, and the execution time 314. As illustrated, each of a number N of sets of instructions, as indicated by numbers 1 through N for each of the stored information 311-315, is submitted for execution by the GPU 102 for the window 301 and execution of the N sets of instructions is completed for the window 301 by components of the GPU 102. For the window 301, a total number of sets of instructions 316 is tracked. In some embodiments, the total number of sets of instructions 316 is broken down into subcomponent totals and the total number of sets of instructions 316 includes totals for each of the respective set IDs 311 executed for the window 301.

Based on at least one of the set start time 312 and the set end time 313 for the set IDs 311, a set time predictor 321 calculates and provides a predicted set time 315 for subsequent sets of instructions having a same set ID 311 in subsequent windows such as the second window 302. For example, execution of sets of instructions sharing a same set ID 311 in the first window 301 are likely to take a same amount of time to execute in the second window 302. In some embodiments, these predicted set times 315 for the N sets, or for each respective set ID 311, are aggregated and provide a predicted set time 315 based on an average or subset of predicted times of sets of instructions (e.g., identified by set ID 311) in subsequent windows such as the second window 302. For example, the information from the set time predictor 321 is used for determining a set limit 325 for one or more subsequent windows such as the second window 302. Each window, such as the second window 302, is defined by a number of sets of instructions, and each set itself includes a number of draws (draw instructions). In some embodiments, the set limit 325 is a total number of sets of instructions allowed active before the GPU 102 starts throttling execution of a number of sets of instructions. In some embodiments, the set limit 325 is used as a new maximum number of sets of instructions to include or otherwise execute in a subsequent window such as the second window 302. The set limit is then referred to as a window set limit 326 where the number of sets is limited or throttled in the second window 302 and subsequent windows. In other embodiments, the set limit 325 is a maximum number of instructions to include in each set of instructions of a subsequent window. In such case, the command processor 122 counts the number of instructions per set and only submits a throttled number of instructions per set where each set shares one or more particular set IDs 311.

In some embodiments, the set limit 325 is used by the set manager 121 to predict or estimate an execution time for sets of instructions of other windows including for sets of instructions sharing the same set ID 311. Other set information associated with the first window 301 is combined or used with one or more of the stored information 311-315 to determine the set limit 325. In some embodiments, the set limit 325 is a total number of sets of instructions to submit to the processor pipeline 123 in the second window 302 and windows subsequent to the first window 301. In some embodiments, the set limit 325 is a total number of sets of instructions sharing the same set ID 311 to submit to the processor pipeline 123 for the second window 302 or for a plurality of windows subsequent to the first window 301. Based on an execution time for one or more sets of instructions of the first window 301 submitted to the processor pipeline 123, the set limit 325 is applied to the second window 302 including to at least one set of the second window 302.

According to some embodiments, a set of instructions 340 ("set") includes instructions from the software application 111 in the form of a plurality of wavefronts 341, 342. For convenience of illustration, these wavefronts 341, 342 are numbered 1 through N. The instructions (e.g., wavefronts, warps, sets of instructions, groups of instructions) of the set 340 are distinguished from CPU-based instructions (executed by components of the CPU 101) in one or more characteristics. For example, the set instructions are divisible or otherwise separated for execution by a plurality of parallel process units 331-334 of the processor pipeline 123. Examples of process units 331-334 include a shader unit, a vertex draw unit, and a vertex shader unit. In some embodiments, the set instructions operate according to the SIMD paradigm where the instructions for individual frame fragments are computed or executed by the parallel process units 331-334.

In operation, the set manager 121 keeps track of a number of draws or events in units of sets of instructions of (draw) instructions such as by using marker events as delimiters for each set submitted to and tracked at the processor pipeline 123. Keeping track of the number of events is a tuning mechanism and tracking the number of sets of instructions, and thereby a number of draw instructions allowed into those sets of instructions, creates a mechanism to throttle sets of instructions within the GPU 102. In some embodiments, a marker event is one or more programmer-supplied execution instructions in a routine or program whose sole function is to mark that particular position during execution. For example, ahead of a call to a routine called "COL_VERT" to color vertex points, a line of code would mark a start of the routine by a marker as follows: "nvMark ("Start of COL_VERT" . . . ");" where the name nvMark is the name of the function that marks the start of a subsequent set of instructions and the string of text inside the parentheses and quotation marks is arbitrary and programmer-supplied. In a like manner, a same call to the nvMark function with a string such as "End of COL_VERT" as an instruction following a last line of instruction marks the end of a set of instructions sent to the processor pipeline 123. The set manager 121 keeps track of an execution time of each set based on these marker events. In some embodiments, a type of start marker event is a same type of marker event as a type of end maker event for a purpose of determining the set start time 312 and the set end time 313, respectively. In the example above, the nvMark function is a first type of marker event, and a second type is, for example, a second function "nvDraw" that accepts a same type or a different type of argument or a same number or a different number of arguments compared to nvMark. In other embodiments, the start marker event is a different marker event type as a type of the end maker event for the purpose of determining the set start time 312 and the set end time 313, respectively. In the example, for different marker event types, the start marker event could be a call to the nvMark function and the end marker event would be a call to the nvDraw function.

As another embodiment of a marker event, an extra and optional argument in an otherwise regular function call serves as the marker event. For example, for a function "DrawMeARiver" accepting two arguments, a third argument appearing in the function call serves to cause the GPU 102 to mark the execution of a particular set of instructions when executing this particular function with the extra argument. The extra argument serves as either a start marker event or an end marker event for the set of instructions. Different values of the third argument communicate "start" and "end" for the particular function, respectively. The third argument and start and end could be triggered simply by the values of "0" and "1", respectively. For a particular example, a call such as "DrawMeARiver(VAR_1, VAR_2, 0);" sent to the processor pipeline 123 indicates to the processor pipeline 123 and the GPU 102 that a start marker event is present because of the presence of "0" as the third argument of the function. The "0" then marks the set start time 312. A value of "1" when present as an optional argument in the same or a different function causes the set manager 121 to mark or store the set end time 313 for the particular set of instructions for the particular window under evaluation.

The set manager 121, in cooperation with the command processor 122, records an initial time that a particular marker event associated with the set of instructions 340 is sent to or scheduled for execution at the processor pipeline for a particular set of instructions. By equating a window with a total number of sets of instructions allowed, and as the draws of the set of instructions in the processor pipeline 123 complete, any unused sets of instructions are added back to an available number of sets of instructions to use again. The set of instructions 340 is an example of a type or unit of graphics instruction to be completed by the GPU 102. The set manager 121 records the set end time 313 when the designated marker completes at or returns to the set manager 121 from the processor pipeline 123. In some embodiments, the initial set start time 312 and the set end time 313 are stored in respective timestamp structures of the GPU 102, structures that are in the set manager 121 or in the GPU 102 and accessible by the set manager 121. The difference between the two set times 312, 313 is a set execution time 314 for the respective set having a corresponding set ID 311.

By computing and having the set execution time 314, the set manager 121 is able to indicate to the GPU 102 an amount of availability of the processor pipeline 123 for set execution in the second window 302 or a window subsequent to the first window 301. By way of example, where the processor pipeline 123 has a maximum capacity per window for executing instructions per window, the set manager 121 uses the set execution times 314 to estimate for the command processor 122 an amount of additional sets of instructions that can be added in a subsequent window within the maximum capacity for that window. In certain embodiments, the additional sets of instructions are sets of instructions sharing one or more set IDs 311 so that the set manager 121 is selective in providing a certain type of instructions for processing by the processor pipeline 123. In other embodiments, the set manager 121 provides a number of instructions to include per set in each respective sets of instructions for the subsequent window. In some embodiments, the predicted set time 315 is the set execution time 314 for the respective set of instructions 340 having the particular set ID 311 and the amount of availability communicated is a time value for a subsequent window. The time of additional availability is converted to a number of sets of instructions to be submitted in a subsequent window. According to some embodiments, one or more of the predicted set times 315 of the respective sets of instructions 340 are used to predict a performance of the processor pipeline 123 for a subsequent window such as the second window 302. Determination of the predicted set time 315 is performed at least in part by the set time predictor 321.

In response to determining an availability of the processor pipeline 123, the processor (e.g., one or more of the CPU 101 and the GPU 102) determines a number of sets of instructions to issue to the processor pipeline 123 for one or more subsequent windows such as the second window 302. For example, the set manager 121 determines one or more of a set limit 325 for each particular set ID 311 and an overall window set limit 326 for one or more subsequent windows such as the second window 302. This throttling mechanism allows the set manager 121 to adaptively tune workload submission to the processor pipeline 123. Since this throttling mechanism is all or substantially all hardware based, there is no driver involvement required other than programming the desired performance. The throttling is stored in the GPU 102 such as in the set manager 121 for the windows in the form of the set limit 325 for each particular set ID 311 or in the form of the window set limit 326 for all windows 301, 302.

Conventional mechanisms do not track set of instructions by using structures within the GPU 102 thereby making it difficult to quickly limit an amount of work at the processor pipeline 123 in a sufficiently responsive manner, and thereby limiting a number of sets of instructions per window 301, 302 executing in the processor pipeline 123. The set manager 121 provides control of the processor pipeline 123 and thereby control of the behavior of the GPU 102 at a level of the software application 111 through tracking of the set ID 311. The throttling mechanism provides benefits in multiple contexts such as, for example, limiting a number of graphics frames per second (FPS) rendered by the GPU 102 for all applications active on the system 100, providing a mechanism for reducing power consumption as part of a power management scheme to control use of a battery (not illustrated) providing power to the system 100, and improving a quality of service (QoS) characteristic of graphic elements generated by the software application 111 on a display (not illustrated). As a further example of an application of the throttling mechanism, one or more QoS concerns involve world switching times. By tracking set processing start and end times 312, 313, the system 100 more quickly performs world switches by controlling how many sets of instructions 340, by set ID 311, enter the processor pipeline 123. Changes and execution of instructions in the GPU 102 are implemented at a window boundary, a point in time between execution of instructions of the first and second windows 301, 302.

Figure 4:
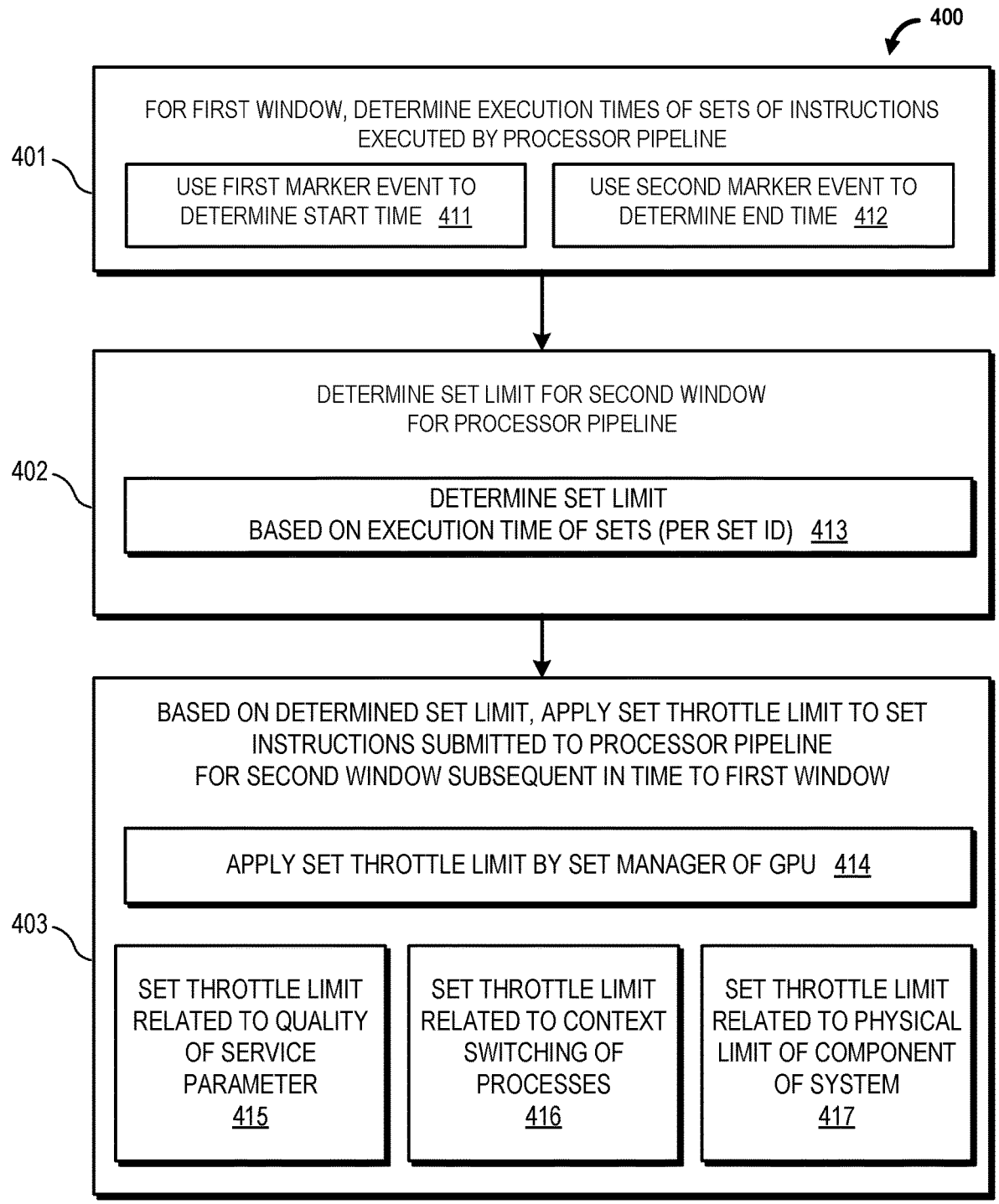
FIGS. 4 and 5 are block diagrams of a method for throttling a processor pipeline based on marker events according to some embodiments.

FIG. 4 is a block diagram of a method 400 for throttling a processor pipeline based on marker events according to some embodiments. The method 400 includes, at block 401, determining execution times of sets of instructions executed by a processor pipeline such as the pipeline 123. The execution times are determined for a particular window such as the first window 241, 301. In some embodiments, determining of the execution times includes, at block 411, using a first marker event to determine a start time for a respective set of instructions, and, at block 412, using a second marker event to determine an end time of execution for the respective set of instructions.

The method 400, at block 402, also includes determining a set limit for one or more subsequent windows such as a second window. At block 413, the set limit is determined based on an execution time of sets of instructions sharing a same set identifier (ID). At block 403, based on the determined set limit, the method 400 includes applying a set throttle limit to control a number of set instructions submitted to a processor pipeline for a second window or submitted during a second window. In some embodiments, applying the set throttle limit includes limiting a number of sets of instructions in the second window having the same set ID as used to determine the set limit from information derived from execution of sets of instructions in the first window. That is, the set ID is employed to identify the same or similar windows that are processed at different times. The set ID allows for tracking from window to window at a low-level in the hardware components that complete execution of the sets of instructions. The same set ID indicates instructions from a same thread, process, software application, or operating system function. The second window is subsequent in time to the first window. In some embodiments, at block 414, the set throttle limit is applied by a set manager such as the set manager 121 of the GPU 102 and the limit is applied to some or all of the sets of instructions of the second window. When applying the set throttle limit for the second window, the set manager 121 performs one or more activities such as: reducing a number of sets of instructions having a same set ID for execution in the second window, dropping a number of sets of instructions from execution during the second window, reducing an instruction count for sets of instructions sharing a same set ID for execution during the second window, and shifting execution of the sets of instructions originally scheduled for execution in the second window to another window subsequent in time to the second window.

The set throttle limit is applicable in a variety of scenarios. As a first example, at block 415, the set throttle limit is related to a quality of service (QoS) parameter associated with an application such as the software application 111 of the system 100 where the instructions of the software application 111 are operative in the CPU 101 and instructions 114 are passed to the GPU 102. To improve a world switching time, the set throttle limit is applied in the system 100 to more quickly perform a world switch by controlling how many sets of instructions having a particular set ID in a second and subsequent window enter a processor pipeline. A result of applying the set throttle limit in this context is an increase in a number of sets of instructions having other set IDs in the second window and thereby increased number of instructions processed by the processor pipeline.

As another example of applying the set throttle limit, at block 416, the set throttle limit is related to a context switching of processes such as when a second application becomes more active in the system 100 than a first application, and the applications have blocks and corresponding sets of instructions and set IDs pending for execution ahead of the processor pipeline 123. That is, based on a context switch signal received at the GPU 102 such as at the set manager 121, the set limit 325 is applied to sets of instructions in the GPU 102 having a particular set ID in a subsequent window and submitted for execution by the processor pipeline 123.

As a third example of applying the set throttle limit, at block 417, the set throttle limit is related to a physical limit or resource of one or more components of the system 100. To conserve power supplied to the system 100 by a battery, the set throttle limit is applied to windows 242, 243 subsequent to the first window 241 and a reduced number of sets of instructions in the windows 242, 243, and thereby a reduced over number of instructions, are executed by the processor pipeline 123. Consequently, a workload of the processor pipeline 123 is reduced based on the set throttle limit. A reduced power consumption is initiated by the GPU 102 (in a hardware component) without a change initiated by a component or instruction of the software application 111, the graphics API 112, the GPU driver 113, or some component of an operating system (not illustrated) in the system 100. The set throttle limit reduces the workload within the processor pipeline 123 to meet an overall power target for the processor pipeline 123.

As another example of applying the set throttle limit to match a physical limit or resource of the system 100, one or more of the set limit 325 and the window set limit 326 are applied to subsequent windows 242, 243 to limit a graphics throughput of the system 100. The graphics throughput is capped at a limit such as to a vertical synchronization (VSync) limit of a monitor coupled to the GPU 102 of the system 100. In terms of specific numbers in this VSync example, when the monitor as an output device is only capable of displaying 60 frames per second (FPS), the system 100 limits production of frames to the physical limit of the monitor. In particular, the frames in the frame buffer 131 in either the system memory 103 or the graphics memory 104 are generated by the graphics processor pipeline 123 are only generated at a rate that matches the capacity of the monitor to display the generated frames. Instructions to generate data in excess of 60 FPS are not submitted to the processor pipeline 123 based on application of the set throttle limit. For a GPU 102 having substantial capacity, window capacity is reserved for other uses (e.g., for other programs operative on the CPU 101 and sets of instructions having other set IDs that do not impact the display of the frames of the 60 FPS. Data in excess of the 60 FPS (i.e., vertices and shading of graphics for frames unable to be displayed) are not produced by the processor pipeline 123 based on application of the set throttle limit. This limit is applied by the GPU 102 at a hardware level without a change initiated, made, or maintained by a component or instruction of the software application 111, the graphics API 112, the GPU driver 113, or some component of an operating system (not illustrated) in the system 100. This throttling by the GPU 102 reduces resource utilization by the processor pipeline 123 and lowers power consumption by harmonizing the various components of the system 100 and more efficiently using the processor pipeline 123 at the level of sets of instructions submitted to the processor pipeline 123.

Figure 5:
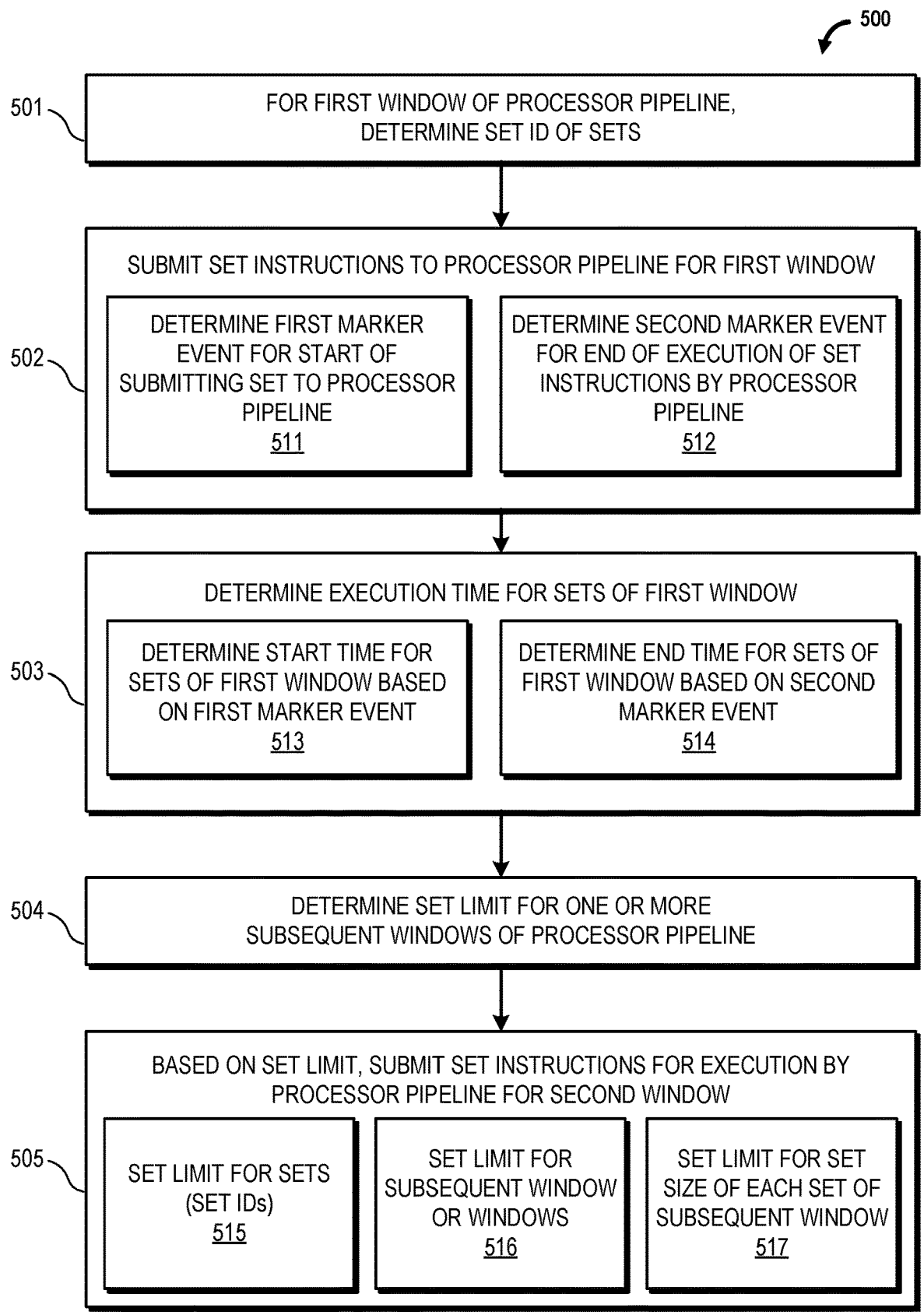

FIG. 5 is a block diagram of a method 500 for throttling a processor pipeline based on marker events according to some embodiments. The method 500 includes, at block 501, determining set IDs of sets of instructions to be submitted for execution by a processor pipeline for a first window such as the first window 241, 301. Determining the set IDs includes determining which one or more set IDs are associated with a particular application or set of executing threads such as those of the software application 111 operative in the CPU 101. One, two, or more, or even all, of the set IDs of the sets of instructions of the first window, and execution information of these sets of instructions, are identified and used in the mechanism.

At block 502, sets of instructions of the first window are submitted for execution by the processor pipeline 123. As part of this method 500, at block 511, a first marker event is determined to be able to mark and thereby track a start time 312 of submitting a respective set of instructions, the sets of instructions having a particular set ID, to the processor pipeline for execution. At block 512, a second marker event is determined to be able to mark and thereby track an end time 313 of submitting a respective set of instructions to the processor pipeline for execution.

For each set of instructions of the first window submitted to the processor pipeline, a set execution time is determined at block 503. In some embodiments, at block 513, determining the execution time includes determining the start time for each set of instructions of the first window based on the first marker event. At block 514, determining the execution time also includes determining the end time for each set of instructions of the first window based on the second marker event. According to some embodiments, determining the execution time includes determining an average execution time for sets of instructions having a same set ID for the first window.

The method 500 also includes, at block 504, determining a set limit for one or more windows, subsequent in time to the first window, of the processor pipeline. The set limit is capable of limitation by one or more of a user constraint and a hardware constraint.

At block 505, sets of instructions are submitted for execution by the processor pipeline for the second processor window or a subsequent-in-time window based on the set limit determined at block 504. In some embodiments, applying the set limit is based on the execution time of at least one set of instructions of the first window in excess of a predetermined threshold. In the method 500, according to some embodiments, only sets of instructions sharing the set IDs determined for the first window are affected by or subjected to throttling or control based on the set limit determined at block 504. In other embodiments, all sets of instructions of one or more windows subsequent in time to the first window are subject to the applied set limit. For example, at block 515, applying the set limit includes applying a set limit for sets of instructions having a particular one or more set IDs for the second or subsequent window such as set IDs derived or based on one or more executing thread identifiers or application identifiers associated with the software application 111.

Applying the set limit includes, at block 516, applying a set limit for one or more windows subsequent to the first window. A maximum number of sets of instructions belong to a particular window is identified and set, and a number of sets of instructions is reduced until meeting the maximum number or set threshold for the particular window. The maximum number of sets of instructions is a changeable number of sets of instructions per window based on behavior of the sets of instructions in windows as the system 100 and the processor pipeline 123 execute over time. In some embodiments, application of the set limit applies to all sets of instructions of a window without regard for set ID. In the same or other embodiments, all processor windows are subject to the set limit determined based on information generated from the first window or from one or more windows previous in time to the particular window. For example, a set limit for an Nth window is based on information from sets of instructions of an (Nth−1) window or from an aggregate of sets of instructions of a number X of windows [1−(N−1)], each of these sets of instructions having a particular set ID.

Applying the set limit includes, at block 517, applying a limit to chunk size for each chunk belonging to a particular window that is subsequent in time to the first window. Applying a chunk size limit includes reducing a number of instructions (e.g., an overall total number of instructions, an overall number of instructions per set ID) in each set of the window according to a maximum chunk size when submitting the chunk to the processor pipeline thereby allowing each set of the throttled window to complete in fewer GPU processor cycles. The process at block 517 includes selecting a chunk size to adaptively tune workload submission for a particular application such as the software application 111. Since this throttling mechanism is all hardware based, there is no driver involvement required other than programming or setting a desired level of performance of the processor pipeline.

The throttling mechanisms described above are implemented by the GPU 102 and are hardware-based. The throttling mechanisms provide more efficient management of the GPU 102 relative to software-based and partial-software, partial hardware approaches. In some embodiments, no software-based driver is involved in the characterizing and managing of the sets of instructions. The hardware-based mechanism is more responsive than software-based mechanisms and is more difficult to bypass. A software-based mechanism, in user space or otherwise, is slower in part because a feedback loop for throttling or controlling sets of instructions and windows is very long compared to a hardware-based mechanism. A software-based mechanism and system would be unable to track individual sets of instructions within the GPU 102. A software mechanism would only be able to track packets of sets of instructions such as at prefetch logic structures. A software-based mechanism is unable to control when data are fetched and when sets of instructions are submitted to the processor pipeline 123 of the GPU 102.

In terms of components, in some embodiments, the apparatus and techniques described above are implemented in a system such as the system 100 including one or more integrated circuit (IC) devices (also referred to as integrated circuit packages or microchips), such as the processors described above with reference to FIGS. 1-5. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or flash-based memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software includes one or more of the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A processor comprising:
a processor pipeline having a set of parallel processing units for executing instructions; and
a set manager coupled to the processor pipeline, wherein the set manager is configured to:
receive one or more sets of instructions;
characterize at least one of the received sets of instructions during a first window of time;
subsequent to the characterization, receive a plurality of sets instructions for execution, wherein the plurality of sets of instructions includes at least one previously characterized set of instructions;
determine and apply a set limit comprising a number of instructions to be executed at the processor pipeline during a second window of time subsequent to the first window of time based on the characterization; and
provision a set of instructions of the plurality of sets of instructions to be executed at the processor pipeline during the second window of time based on the set limit.

2. The processor of claim 1, further comprising:
a command processor configured to receive the instructions for execution by the processor pipeline; and
wherein the set manager is configured to characterize the at least one of the received sets of instructions by identifying a set start time; a set execution time; and a set end time for the at least one of the received sets of instructions.

3. The processor of claim 1, wherein the characterizing includes determining an execution time based on one or more of a start marker event and an end marker event as a delimiter, respectively, for the set of instructions.

4. The processor of claim 1, the set manager further comprising:
a set time predictor configured to determine a predicted set time for the set of instructions, and wherein the set manager is further configured to provision the set of instructions of the plurality of the sets of instructions to the processor pipeline in the second window of time based on the predicted set time.

5. The processor of claim 1, wherein the set manager is to provision the plurality of sets of instructions based on a quality of service parameter for at least one of the plurality of sets of instructions.

6. The processor of claim 1, wherein the set manager is to provision the plurality of sets of instructions based on a context switch time associated with the plurality of sets of instructions.

7. The processor of claim 1, wherein the set manager is to provision the plurality of sets of instructions based on a power setting for the processor.

8. The processor of claim 1, wherein the set manager is to provision the plurality of sets of instructions based on a throughput setting for the processor.

9. A method for executing instructions by parallel processing units of a processor, the method comprising:
for a first window of time, characterizing sets of instructions executed by a processor pipeline having the parallel processing units;
determining and applying, based on the characterizing, a set limit comprising a number of instructions to be executed at the processor pipeline during a second window of time subsequent in time to the first window of time; and
based on the determined set limit, provisioning sets of instructions to be executed at the processor pipeline during the second window of time.

10. The method of claim 9, wherein determining the set limit for the second window of time includes determining the set limit based on execution times of sets of instructions sharing a same set identifier in the first window.

11. The method of claim 9, wherein provisioning comprises provisioning the sets of instructions based on a quality of service parameter associated with the sets of instructions.

12. The method of claim 9, wherein provisioning comprises provisioning the sets of instructions based on context switch time associated with the sets of instructions.

13. The method of claim 9, wherein provisioning comprises provisioning the sets of instructions based on a power setting for the processor.

14. The method of claim 9, wherein provisioning comprises provisioning the sets of instructions based on a throughput setting for the processor.

15. A processing unit comprising:
a command processor configured to receive instructions for execution from a software application;
a processor pipeline having a set of parallel processing units for executing the instructions; and
a set manager coupled to one or more of the processor pipeline and the command processor, wherein the set manager is configured to:
determine an execution time for a set of instructions of a first window of sets of instructions submitted to the processor pipeline during a first window of time based on at least one of a set start time, a set end time, and a set execution time;
determine and apply a set limit comprising a number of instructions to be executed at the processor pipeline during a second window of time subsequent to the first window of time based on the execution time of at least one set of instructions of the first window; and
provision a set of instructions to be executed at the processor pipeline during the second window of time based on the set limit.

16. The processing unit of claim 15, wherein the set manager is further configured to:
determine and apply a set limit for the second window of time based on execution times of sets of instructions sharing a same set identifier in the first window.

17. The processing unit of claim 16, wherein applying the set limit based on the execution time of at least one set of instructions of the first window includes:
determining an average execution time for sets of instructions having a same set ID for the first window; and
applying a same set limit to all sets of instructions having the same set ID in a plurality of windows subsequent to the first window.

18. The processing unit of claim 15, wherein provisioning includes provisioning based on at least one of a quality of service parameter, a context switch time, a power setting of the processing unit, and a throughput setting of the processing unit.

19. The processing unit of claim 15, wherein determining the execution time of the set of instructions of the first window includes:
identifying a first marker event for the set of instructions for the first window of sets of instructions;
determining a set start time based on the first marker event for the set of instructions;
identifying a second marker event for the set of instructions for the first window; and
determining a set end time based on the second marker event for the set of instructions.

20. The processing unit of claim 15, wherein provisioning the set of instructions of the second window of time based on the execution time of at least one set of instructions of the first window includes:
adjusting a number of sets of instructions issued to the processor pipeline for the second window of time; and
adjusting a set-size for the sets of instructions of the second window of time.

* * * * *